No. 728,492. PATENTED MAY 19, 1903.
A. N. NORRIS.
GRAIN DRILL.
APPLICATION FILED SEPT. 26, 1902.
NO MODEL. 2 SHEETS—SHEET 1.
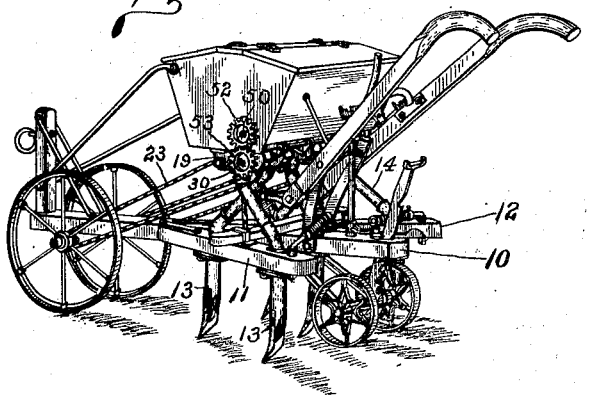
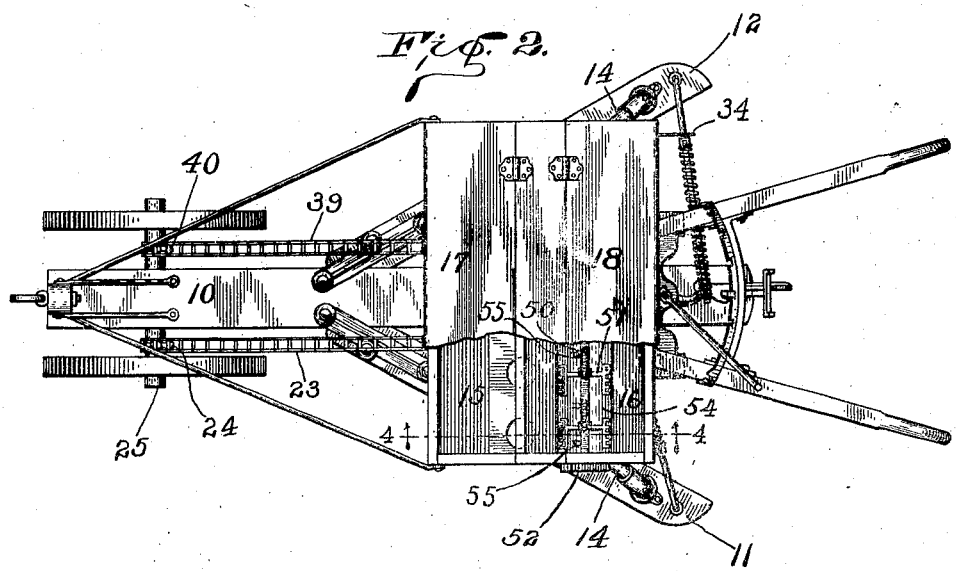
WITNESSES:
C. S. Frye
A. S. Gearing
INVENTOR.
Albert N. Norris,
BY Chester Bradford,
ATTORNEY.

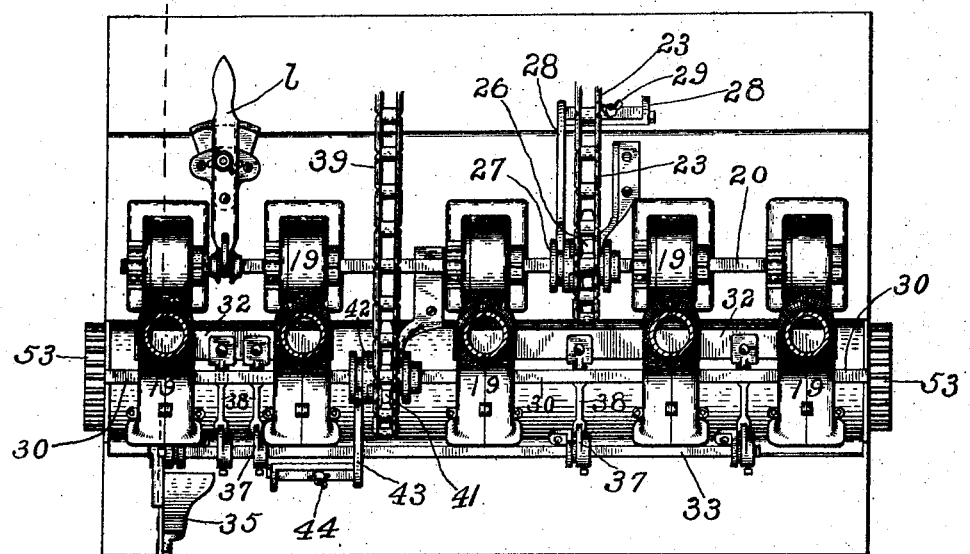
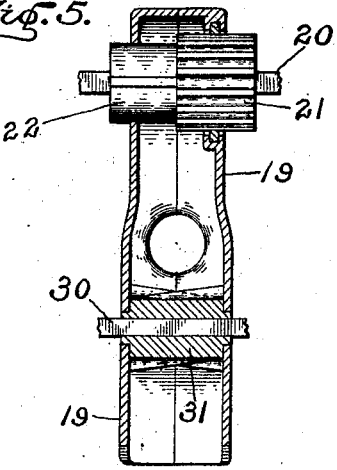
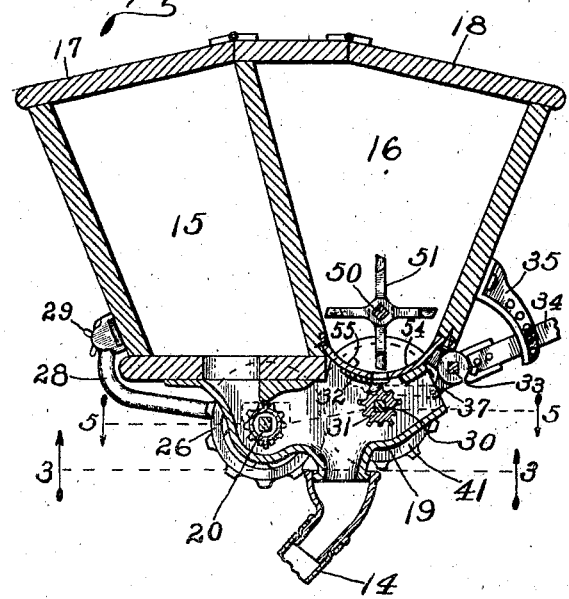

No. 728,492. Patented May 19, 1903.

UNITED STATES PATENT OFFICE.

ALBERT N. NORRIS, OF RUSHVILLE, INDIANA.

GRAIN-DRILL.

SPECIFICATION forming part of Letters Patent No. 728,492, dated May 19, 1903.

Application filed September 26, 1902. Serial No. 124,946. (No model.)

*To all whom it may concern:*

Be it known that I, ALBERT N. NORRIS, a citizen of the United States, residing at Rushville, in the county of Rush and State of Indiana, have invented certain new and useful Improvements in Grain-Drills, of which the following is a specification.

My present invention relates to that class of agricultural implements used in planting small seeds which are provided with an adjustable force feed and whereby fertilizer is also supplied as the planting progresses, the seed and the fertilizer being thus mixed together and deposited simultaneously by the same operation.

A machine or implement embodying said invention will be first fully described and the novel features thereof then pointed out in the claims.

Referring to the accompanying drawings, which are made a part hereof, and on which similar reference characters indicate similar parts, Figure 1 is a perspective view of a grain-drill and fertilizer-distributer embodying my said invention; Fig. 2, a top or plan view thereof, a portion of the top of the box containing the seed and fertilizer being broken away, showing the interior; Fig. 3, a view of the under side of the box and the mechanism attached thereto as seen when looking upwardly from the dotted line 3 3 in Fig. 4; Fig. 4, a transverse vertical sectional view through the box and the grain and fertilizer feeding mechanism attached thereto as seen from the dotted line 4 4 in Figs. 2 and 3; and Fig. 5, a detail sectional view, on an enlarged scale, showing especially the feeding-wheels and their relative arrangement.

This machine has a main central frame member 10, with two wings 11 and 12 pivotally mounted thereon and which carry the drill-teeth 13, and said drill-teeth are connected to the feeding apparatus by telescopic tubular spouts 14, which lead up to the grain and fertilizer receptacles 15 and 16 in the duplex box provided for that purpose and carried by said framework, said receptacles being respectively provided with covers 17 and 18, by means of which convenient access is had thereto.

In using this machine the grain or seed is placed in the receptacle 15, which is provided with as many openings in its bottom as there are sets of feeding mechanisms. The machine illustrated contains five sets of such feeding mechanisms, as is best indicated in Fig. 3, where the several casings or housings 19, in which are the chambers containing the same, are shown. The feed-wheels for the seed are mounted on the shaft 20 and are each composed of a corrugated part 21 and a smooth part 22. The feed is regulated by moving the shaft endwise by means of the shifting-lever 1, so that more or less of the corrugated part will come into action. The smooth part will, obviously, have no effect to feed the seed through, and when said smooth part is under the opening in the seedbox no feeding will of course take place; but when the corrugated part is under the opening in the bottom of the feed-box there is a regular force feed, and as the parts can be shifted so that more or less of each is exposed the quantity of feed may be regulated at will. The feed-wheel shaft 20 is driven by a sprocket or chain belt 23, running from a sprocket-wheel 24 on the axle 25 to a loosely-mounted sprocket-wheel 26 on the shaft 20, said sprocket-wheel being controlled in its movements so as to revolve with said shaft 20 by means of the shifting clutch 27, which in turn is manipulated by the handle 28, and said handle is adapted to be locked in position by the thumb-nut 29.

The shaft 30 carries the fertilizer-feeders 31, which are located directly below perforations in the bottom of the fertilizer-receptacle 16 and support and stop the egress of the fertilizer except when in motion. These fertilizer-feeders 31 are of a peculiar form. Generally they are in the form of fluted rollers; but the ribs thereon are partially cut away, each rib being of full height at one end and sloped gradually to the other end, where it nearly disappears, the point of commencement of the cut being alternately at one end and the other of the roll, so that taking the roll as a whole it is of the least diameter at the center, at the point where the inclinations of the ribs cross each other, at which point all of the ribs are of substantially equal height. This peculiar form has the effect to cause the greatest discharge at the center, while giving the roll greater capacity to seize and crush lumps of fertilizer at the ends, where the ribs are higher and where by reason of having every other one cut away, as described, they are, in effect, twice as far apart as at the center. The amount of fertilizer which shall pass through to the fertilizer-feed rolls 31 is controlled by means of the slide-gates 32, which are manipulated from a rock-shaft 33 by means of a lever 34, which lever is held to any desired position by engagement with a segment 35. The rock-shaft 33 has a number of arms 37, which are connected, by means of links 38, to the gates 32. The shaft 30, which bears the fertilizer-feeding wheels 31, is driven by a chain or sprocket belt 39, which runs from a sprocket-wheel 40 on the axle 25 to a loosely-mounted sprocket-wheel 41 on said shaft 30. A clutch 42 is adapted to engage with the sprocket-wheel 41 and cause it to revolve the shaft. The clutch is moved by an arm or handle 43, and said handle is adapted to be locked in position by a thumb-nut 44.

The power connections which drive the seed-feeding wheels and the fertilizer-feeding wheels being separate and independent and provided with separate and independent clutches, either or both may be thrown into operation at will, so that either seed or fertilizer, or both at once, may be discharged from the machine and by means of the regulating devices in any proportion and at any speed desired.

Within the fertilizer-receptacle 16, immediately above the bottom thereof, is a shaft 50, carrying a series of fertilizer stirrers and pulverizers 51. These latter consist of a series of arms extending out from a hub on the shaft, the outer ends thereof being widened out parallel with the shaft and containing a series of notches, so that the ends of said arms are virtually toothed, as shown, and adapted to grind up or pulverize the fertilizer very efficiently. The bottom of the fertilizer-receptacle 16 is formed of a curved plate 54, as best shown in Fig. 4, the curve being substantially concentric with the axis of the stirrers. Upon an adjacent wall to these stirrers, preferably upon the plate 54, are teeth 55, which intermesh with the teeth on the ends of the stirrer-arms and serve both to keep the same free and clear and also to grasp and crush small lumps which may be contained in the fertilizer. The shaft 50 is driven from the shaft 30 by means of the spur-gears 52 and 53, as best shown in Fig. 1.

Having thus fully described my said invention, what I claim as new, and desire to secure by Letters Patent, is—

1. The combination, in a drill, of a box containing two receptacles one for seed and the other for fertilizer and each having orifices through the bottoms, mixing-chambers into which seed and fertilizer is discharged, seed and fertilizer feeding wheels located at the entrances to said mixing-chambers, means for varying the feed of each of said feeding-wheels, and a common spout or conduit leading from the mixing-chamber into which both the seed and the fertilizer are discharged and together conveyed to the ground, substantially as shown and described.

2. The combination, in a drill, of a seed-receptacle, a fertilizer-receptacle, a mixing-chamber into which both said receptacles are adapted to discharge, a seed-feeding wheel located in said chamber, a fertilizer-feeding wheel also located in said chamber, and a stirring and pulverizing device located in the fertilizer-receptacle and adapted to aid in causing the fertilizer to pass thence through into said mixing-chamber, substantially as shown and described.

3. The combination, in a drill, of a seed-receptacle, a fertilizer-receptacle, a common chamber into which said receptacles are adapted to discharge, and feeding devices located in said chamber, the fertilizer-feeding device consisting of a ribbed roll half of the ribs whereon incline from one end toward the other and the other half of the ribs whereon incline oppositely to the others the roll being thus as a whole smallest in diameter at the center, substantially as shown and described.

4. The combination, in a drill, of a seed-receptacle, a fertilizer-receptacle, a series of mixing-chambers secured to the structure containing said receptacles on its under side, seed-feeding wheels mounted in the path of the flow of seed from its receptacle into said chamber and shiftable to vary the feed, fertilizer-feeding wheels mounted in the path of the fertilizer as it passes from said receptacle into said chamber, adjustable gates by which the flow of fertilizer may be determined, stirring and pulverizing devices located in the fertilizer-receptacle above the openings leading to said chamber, a common shaft to the several seed-feeding wheels, a loosely-mounted driver thereon, a clutch also mounted thereon and adapted to engage with said driver and cause it to drive said shaft, a power connection leading from said driver to the axle of the machine, another shaft upon which the several fertilizer-feeding wheels are mounted, a loosely-mounted driver thereon, a clutch also mounted thereon and adapted to engage with said driver and cause it to drive said shaft, and a power connection leading from said driving-wheel to the axle of the machine, said several parts being arranged and operating substantially as set forth.

5. The combination, in a drill, of a compartment to contain fertilizer and having discharging-orifices, chambers below said orifices, feeding-wheels therein, a stirring and pulverizing device in the compartment containing the fertilizer having projections upon the outer ends of its arms, and projections on an adjacent wall of the said compartment adapted to pass between the projections on the stirrer-arms, substantially as and for the purposes set forth.

In witness whereof I have hereunto set my hand and seal, at Indianapolis, Indiana, this 23d day of September, A. D. 1902.

ALBERT N. NORRIS. [L. S.]

Witnesses:
CHESTER BRADFORD,
JAMES A. WALSH.